(12) United States Patent
Tiwari et al.

(10) Patent No.: US 12,470,809 B2
(45) Date of Patent: Nov. 11, 2025

(54) CAPTURING AN IMAGE OF AN OBJECT IN A SCENE

(71) Applicant: Microsoft Technology Licensing, LLC, Redmond, WA (US)

(72) Inventors: Onkar Nath Tiwari, Telangana (IN); Pratik Kumar Jawanpuria, Telangana (IN); Purushottam Madhukar Kulkarni, Telangana (IN); Mukundan Bhoovaraghavan, Telangana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 17/780,098

(22) PCT Filed: Nov. 5, 2020

(86) PCT No.: PCT/US2020/059133
§ 371 (c)(1),
(2) Date: May 26, 2022

(87) PCT Pub. No.: WO2021/113009
PCT Pub. Date: Jun. 10, 2021

(65) Prior Publication Data
US 2022/0417424 A1 Dec. 29, 2022

(30) Foreign Application Priority Data
Dec. 6, 2019 (EP) ..................................... 19214077

(51) Int. Cl.
*H04N 23/60* (2023.01)
*H04N 23/61* (2023.01)
*H04N 23/63* (2023.01)

(52) U.S. Cl.
CPC ............. *H04N 23/64* (2023.01); *H04N 23/61* (2023.01); *H04N 23/633* (2023.01)

(58) Field of Classification Search
CPC ...... H04N 23/64; H04N 23/61; H04N 23/633; H04N 23/632; H04N 23/675
(Continued)

(56) References Cited

U.S. PATENT DOCUMENTS 5,999,651 A * 12/1999 Chang .................... G06T 7/246
382/199
8,345,106 B2   1/2013 Nijemcevic et al.
(Continued)

FOREIGN PATENT DOCUMENTS

| CN | 104408427 A | 3/2015 |
| CN | 110035168 A | 7/2019 |
| WO | 2016139208 A1 | 9/2016 |

OTHER PUBLICATIONS

"Extended European Search Report Issued in Application No. 19214077.0", Mailed Date: Mar. 24, 2020, 8 Pages.
(Continued)

*Primary Examiner* — Usman A Khan
(74) *Attorney, Agent, or Firm* — Ray Quinney & Nebeker P.C.

(57) ABSTRACT

A computing device automatically determines when a user wishes to capture an image of an object in a scene via a camera of the computing device. In response, the computing device presents at a display screen an image of the scene together with an overlay template. The overlay template corresponds in shape to the object in the scene and is overlaid on the object in the scene when displayed at the display screen. The overlay template is not displayed at the display screen when the computing device does not determine that a user wishes to capture an image of an object in the scene.

20 Claims, 4 Drawing Sheets

(58) Field of Classification Search
USPC .................................................. 348/333.02
See application file for complete search history.

(56) References Cited

U.S. PATENT DOCUMENTS

| | | | |
|---|---|---|---|
| 8,441,696 B2 | 5/2013 | Zahnert et al. | |
| 8,593,555 B1* | 11/2013 | Chun ................... | H04N 23/631 |
| | | | 348/333.01 |
| 8,947,453 B2 | 2/2015 | Chen et al. | |
| 10,032,073 B1 | 7/2018 | Buryak et al. | |
| 10,115,031 B1 | 10/2018 | Pashintsev et al. | |
| 10,198,629 B2 | 2/2019 | Segalovitz et al. | |
| 10,380,993 B1* | 8/2019 | Clauer Salyers .... | H04N 23/633 |
| 2007/0086761 A1* | 4/2007 | Okamoto ............... | H04N 23/71 |
| | | | 396/14 |
| 2008/0025710 A1* | 1/2008 | Sugimoto ............ | H04N 23/631 |
| | | | 348/207.99 |
| 2008/0107411 A1* | 5/2008 | Hope ..................... | G02B 7/28 |
| | | | 396/121 |
| 2008/0118156 A1* | 5/2008 | Okada ................ | H04N 23/635 |
| | | | 348/E5.042 |
| 2009/0185738 A1* | 7/2009 | Nepomniachtchi .. | G06Q 20/108 |
| | | | 382/140 |
| 2009/0316016 A1* | 12/2009 | Iwamoto .............. | H04N 23/611 |
| | | | 348/222.1 |
| 2010/0020222 A1* | 1/2010 | Jones ..................... | H04N 5/772 |
| | | | 348/E5.022 |
| 2010/0277438 A1* | 11/2010 | Kawashima .......... | G06F 3/0425 |
| | | | 345/175 |
| 2011/0091092 A1* | 4/2011 | Nepomniachtchi .. | G06Q 20/042 |
| | | | 382/137 |
| 2011/0170740 A1* | 7/2011 | Coleman .............. | H04N 23/661 |
| | | | 348/222.1 |
| 2011/0280450 A1* | 11/2011 | Nepomniachtchi .. | G06V 10/993 |
| | | | 382/112 |
| 2012/0113307 A1* | 5/2012 | Watanabe ............. | H04N 5/2621 |
| | | | 348/333.01 |
| 2012/0321216 A1* | 12/2012 | Kacher .................... | G06T 3/06 |
| | | | 382/275 |
| 2013/0004076 A1* | 1/2013 | Koo ..................... | G06V 30/142 |
| | | | 382/176 |
| 2013/0022231 A1* | 1/2013 | Nepomniachtchi .. | G06Q 20/387 |
| | | | 382/229 |
| 2013/0038759 A1* | 2/2013 | Jo .......................... | H04N 23/56 |
| | | | 348/240.99 |
| 2013/0057713 A1* | 3/2013 | Khawand ............... | H04N 23/80 |
| | | | 348/208.1 |
| 2013/0155309 A1* | 6/2013 | Hill ...................... | H04N 23/635 |
| | | | 348/E5.045 |
| 2013/0271796 A1* | 10/2013 | Landa .................. | H04N 1/4072 |
| | | | 358/463 |
| 2014/0044338 A1* | 2/2014 | Coleman .............. | G06Q 20/108 |
| | | | 382/137 |
| 2014/0086455 A1* | 3/2014 | Kotovich ............... | G06V 30/40 |
| | | | 382/112 |
| 2016/0212342 A1* | 7/2016 | Semenov ................ | H04N 23/64 |
| 2016/0260255 A1* | 9/2016 | Bean ........................ | G06T 5/10 |
| 2016/0373647 A1* | 12/2016 | García Morate .... | H04N 23/635 |
| 2018/0025251 A1* | 1/2018 | Welinder .............. | G06T 11/001 |
| | | | 382/199 |
| 2019/0266590 A1 | 8/2019 | Ekpenyong et al. | |
| 2019/0311227 A1* | 10/2019 | Kriegman ........ | G06V 30/19173 |
| 2021/0360149 A1* | 11/2021 | Mukul ................... | G06F 3/165 |

OTHER PUBLICATIONS

Baek, Jongmin, "Improving the Responsiveness of the Document Detector", Retrieved From: https://blogs.dropbox.com/tech/2016/10/improving-the-responsiveness-of-the-document-detector/, Oct. 19, 2016, 10 Pages.

"International Search Report & Written Opinion issued in PCT Application No. PCT/US20/059133", Mailed Date: Jan. 14, 2021, 12 Pages.

Kiong, Ying, "Fast and Accurate Document Detection for Scanning", Retrieved From: https://blogs.dropbox.com/tech/2016/08/fast-and-accurate-document-detection-for-scanning/, Aug. 9, 2016, 14 Pages.

* cited by examiner

CAPTURING AN IMAGE OF AN OBJECT IN A SCENE

TECHNICAL FIELD

The present disclosure relates to a computing device, method and computer program for capture of an image.

BACKGROUND

A computing device that has or is connected to a camera may be used to capture an image of an object within a scene which is being viewed through the camera. This is often, though not exclusively, done in the case that the object is a document, so as to capture an image of the document, that is, an image only of the document, without any of the background which might be present in the scene. The image of the object may then be subject to processing for various purposes. This may be contrast enhancement, etc. so as to improve the quality of the image, optical character recognition in the case of the object being a document, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

According to a first aspect disclosed herein, there is provided a method of operating a computing device for capture of an image of an object in a scene, the computing device comprising a camera and a display screen, the method comprising:

the computing device automatically determining when a user wishes to capture an image of an object in a scene via the camera of the computing device;

in response to the computing device automatically determining that a user wishes to capture an image of an object in the scene, the computing device presenting at the display screen an image of the scene together with an overlay template, wherein the overlay template corresponds in shape to the object in the scene and is overlaid on the object in the scene when displayed at the display screen; and the computing device capturing an image of the object in the scene by capturing an image of what is contained within the overlay template;

wherein the overlay template is not displayed at the display screen when the computing device does not determine that a user wishes to capture an image of an object in the scene.

Even though the computing device may be in "image capture" mode, the overlay template is only presented on the display screen when actually necessary. This avoids the overlay template appearing to "jump around", that is the overlay template does not move smoothly with the object, if for example the user moves the camera of the computing device relative to the scene, whether deliberately or accidentally.

The automatic determining when a user wishes to capture an image of an object in a scene is not based on for example a manual input by the user (even though a manual input may be used or required in order to initiate the image capture method in the first place). That is, the method may in an example take place after some manual input by the user which indicates that the computing device should enter the image capture mode.

The overlay template may be in the form of a frame. The overlay template may be in the form of a quadrilateral frame, especially in the case that the object in the scene is a document.

The camera and display screen may each be integrally provided as part of the computing device or may be separate and connected to the computing device.

According to a second aspect disclosed herein, there is provided a computer program comprising instructions such that when the computer program is executed on a computing device comprising a camera and a display screen, the computing device is arranged to carry out a method comprising:

the computing device automatically determining when a user wishes to capture an image of an object in a scene via the camera of the computing device;

in response to the computing device automatically determining that a user wishes to capture an image of an object in the scene, the computing device presenting at the display screen an image of the scene together with an overlay template, wherein the overlay template corresponds in shape to the object in the scene and is overlaid on the object in the scene when displayed at the display screen; and the computing device capturing an image of the object in the scene by capturing an image of what is contained within the overlay template;

wherein the overlay template is not displayed at the display screen when the computing device does not determine that a user wishes to capture an image of an object in the scene.

There may be provided a non-transitory computer-readable storage medium storing a computer program as described above.

According to a third aspect disclosed herein, there is provided a computing device for capture of an image of an object in a scene, the computing device comprising;

a camera;

a display screen; and a processing system constructed and arranged to cause the computing device to carry out a method comprising:

the computing device automatically determining when a user wishes to capture an image of an object in a scene via the camera of the computing device;

in response to the computing device automatically determining that a user wishes to capture an image of an object in the scene, the computing device presenting at the display screen an image of the scene together with an overlay template, wherein the overlay template corresponds in shape to the object in the scene and is overlaid on the object in the scene when displayed at the display screen; and the computing device capturing an image of the object in the scene by capturing an image of what is contained within the overlay template;

wherein the overlay template is not displayed at the display screen when the computing device does not determine that a user wishes to capture an image of an object in the scene.

The processing system may comprise at least one processor and at least one memory including computer program instructions, the at least one memory and the computer program instructions being configured, with the at least one processor, to cause the device at least to perform a method as described above.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

As mentioned, when a computing device is being used to capture an image of an object within a scene, an overlay template may be overlaid on the image of the object as presented on a display screen. An example is shown schematically in FIG. 1, which shows a display screen 1 of a computing device. A scene 2 being viewed by a camera of the computing device is presented on the display screen 1. The scene 2 includes an object 3, which in this example is a document 3, which is located on a desk 4. An overlay template 5, which is generated by the computing device, is overlaid on the scene 2 as presented on the display screen 1. In this example, the overlay template 5 is a frame, having a quadrilateral shape to correspond to the outline or edges of the document 3 in the scene 2.

Figure 1:
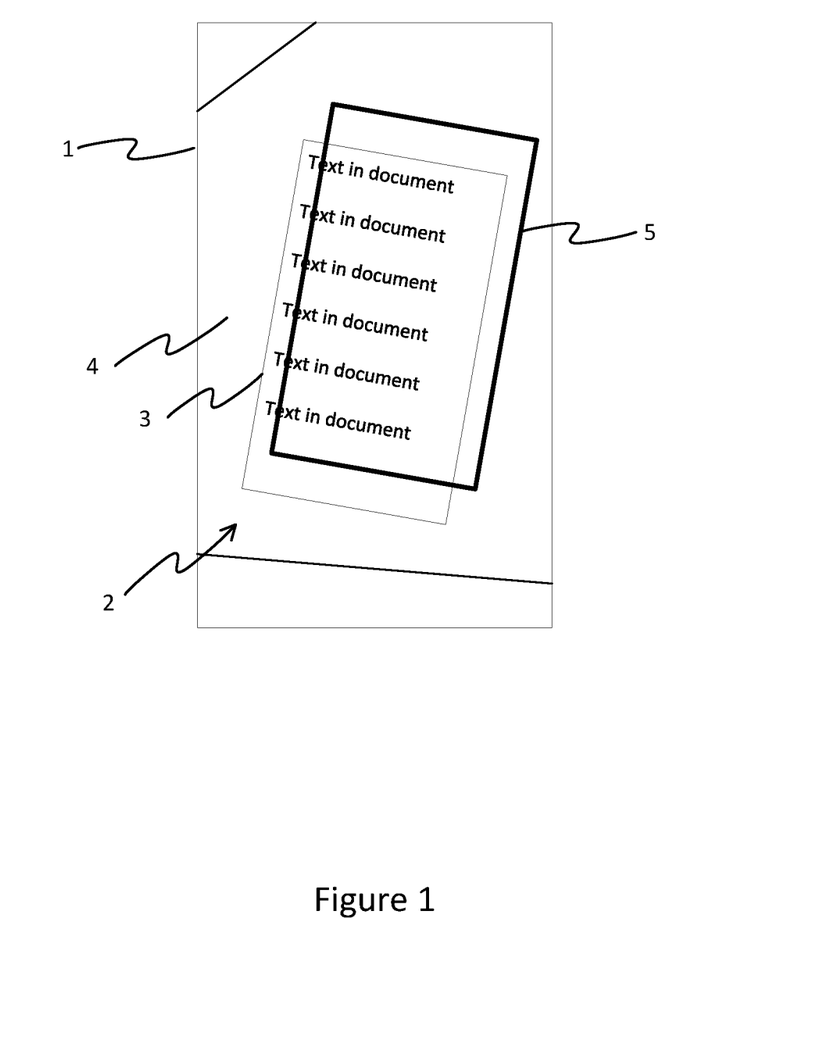
FIG. 1 shows schematically an example of a display screen which is displaying a scene containing an object and an overlay template.

The purpose of the overlay template 5 is to allow the user to see that the object 3, in this example, the document 3, has been appropriately and correctly framed in the field of view. The user can then instigate capture of the image of the object 3, by for example pressing some soft or hard button on the computing device. The computing device then captures an image of what is contained within the overlay template 5, which of course should be the object 3 itself.

A common problem with known arrangements of this type is that the overlay template 5 "jumps" around when presented on the display screen 1 as the camera or the computing device as a whole moves relative to the scene 2. That is, for example, as the object 3 moves across the field of view of the camera and therefore the image as presented on the display screen 1, the overlay template 5 does not move smoothly with the object 3. Instead, the overlay template 5 often "lags" the object 3 and becomes detached from the object 3 in the image as presented. Sometimes, once the movement has stopped or at least sufficiently slowed down or stabilised, the overlay template 5 suddenly "snaps" into location over the object 3. This can be disturbing and distracting for the user. Sometimes, the overlay template 5 can lock into position on a different and therefore incorrect object in the scene. This is a particular problem in the case that the computing device has low or modest computing power as the computing device cannot accommodate relative movement of the object within the field of view quickly enough.

Examples described herein address this in two main ways.

First, the computing device automatically determines when a user wishes to capture an image of an object 3 in a scene 2 via the camera of or connected to the computing device, and only presents the overlay template 5 when it is determined that a user wishes to capture an image of the object 3 in the scene 2: the overlay template 5 is not displayed at the display screen 1 when the computing device does not determine that a user wishes to capture an image of an object 3 in the scene 2.

Secondly, the computing device avoids generating the overlay template 5 from scratch or afresh every time an overlay template 5 is required. Instead, the computing device generates an overlay template 5, typically based on the current object and scene as currently being viewed through the camera, and saves that in data storage. The computing device tracks movement of the object 3 as the camera and scene move relative to each other. Rather than generating the overlay template 5 from scratch again, the computing device adjusts the shape of the saved, previously generated, overlay template 5 based on the tracked movement of the object 3. The new, amended, overlay template 5 fits the object 3 at its new location and orientation, if different. This may occur for each frame of the image, or at least every few frames such as every 5 or 10 frames or so, so that the overlay template 5 matches and sticks to the object 3 as the object 3 moves across the field of view. This can be a much faster process than generating the overlay template 5 from scratch again. This means that the new, amended, overlay template 5 is ready to be displayed over the moved or moving object 3 much more quickly than in known arrangements. Because the new, amended overlay template 5 fits the object 3 at its new location and orientation, if different, this also helps to avoid or minimise the "jumping" of the overlay template 5 which occurs in known arrangements. There will be occasions when it is better to generate a new overlay template 5 from scratch again, rather than amending a previously saved overlay template 5, as will be discussed further below.

One or both of these options may be implemented in a computing device.

Figure 2:
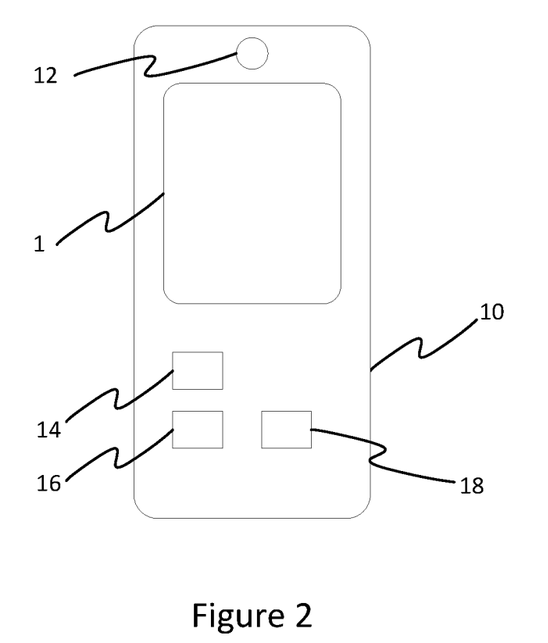
FIG. 2 shows schematically an example of a computing device according to the present disclosure.

Referring now to FIG. 2, this shows schematically an example of a computing device 10 according to the present disclosure. The computing device 10 has a display screen 1, though in other examples the computing device 10 and display screen 1 may be provided separately of each other and connected by a wired or wireless connection. The computing device 10 has a camera 12, though again in other examples the computing device 10 and camera 12 may be provided separately of each other and connected by a wired or wireless connection. The computing device 10 further has the usual processor 14, volatile data storage 16 for holding running software applications and data therefor and non-volatile data storage 18 (or "permanent" storage of software applications, data, etc. The computing device 10 of this example is a so-called "smart phone", which has an integral camera 12 and display screen 1. In other examples, the computing device 10 is of some other type, such as a laptop, notebook or tablet computer, which may have an integral camera or is connected to an external camera. Scenes that are viewed via the camera 12, that is, scenes that are within the field of view of the camera 12, are commonly displayed in real time on the display screen 1.

Figure 3:
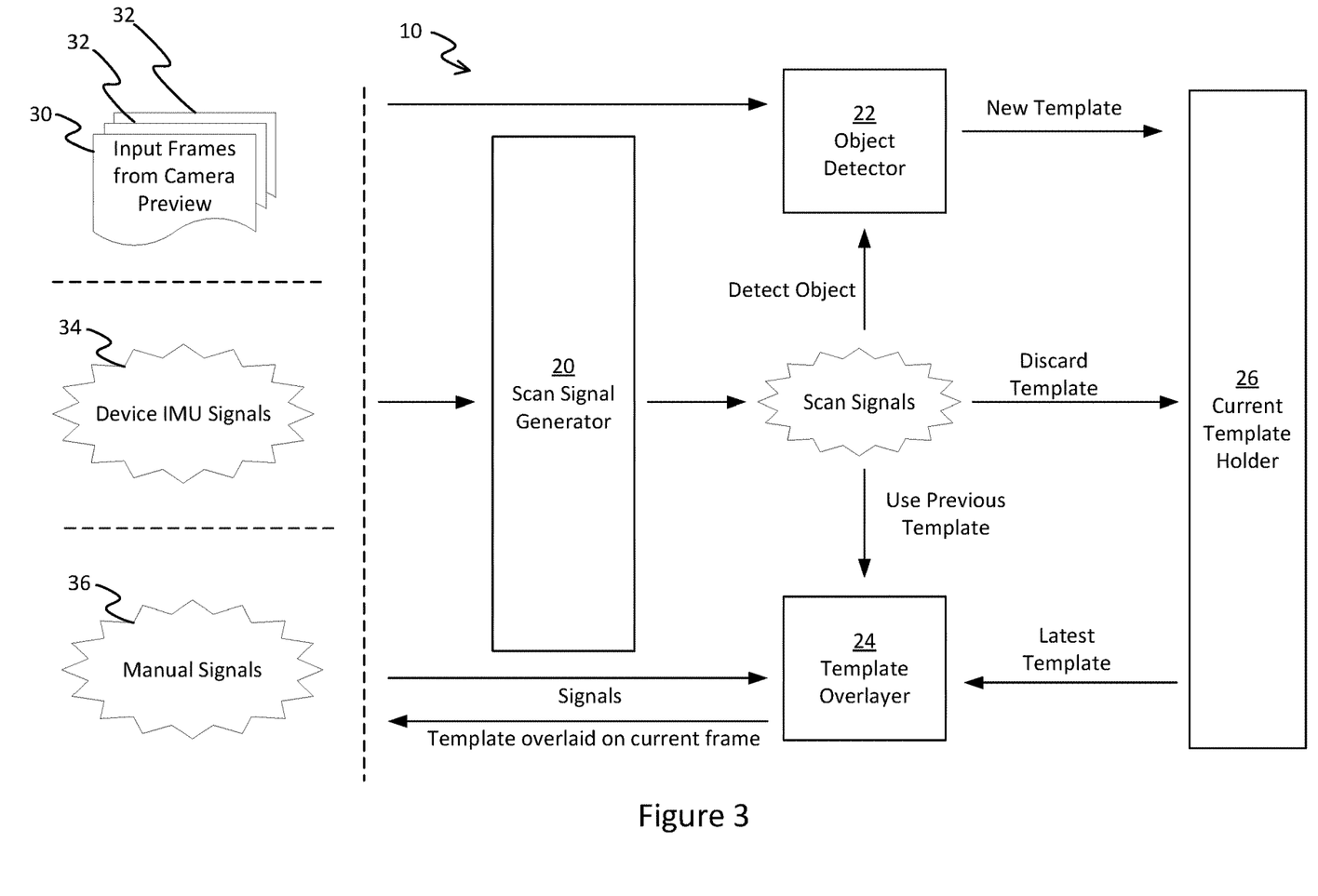
FIG. 3 shows schematically an example of the main components of a computing device according to the present disclosure in more detail.

Referring now to FIG. 3, this shows schematically an example of the main components of the computing device 10 as relevant for the present disclosure in more detail. FIG. 3 also shows schematically the flow of signals within the computing device 10. It will be understood that a number of the items or modules illustrated schematically in FIG. 3 will typically be implemented in software stored in the non-volatile data storage 18 of the device 10 and running on the processor 14 of the device 10 in use.

The computing device 10 has a scan signal generator 20, an object detector 22, a template overlayer 24 and a current template holder 26. The current template holder 26, which stores the current overlay template 5 as will be discussed further below, may be part of the non-volatile data storage 18, but is more conveniently part of the volatile data storage 16 so that space in the non-volatile data storage 18 is not used unnecessarily.

A main purpose of the scan signal generator 20 is to determine when the overlay template 5 should be displayed at the display screen 1. Another main purpose of the scan signal generator 20 is to determine when a new overlay template 5 should be generated. In each case, this may be carried out automatically by the scan signal generator 20. That is, this is carried out by the scan signal generator 20 without requiring a manual input or the like from the user, for example, by the user pressing a hard button of the device 10 or a soft button on the display screen 1 in the case that the display screen 1 is a touch screen. This may therefore follow on from the user having pressed some hard or soft button which instructs the device 10 to enter image capture mode as an initial step in the first place.

In an example, the scan signal generator 20 determines that a user wishes to capture an image of the object 3 in the scene 2 by determining that the camera 12 has been viewing the scene 2 for longer than a predetermined period of time. That is, if the user has been pointing the camera 12 steadily at a particular scene for longer than a predetermined period of time, then the scan signal generator 20 decides that the user wishes to capture an image of the object 3 in the scene 2. The predetermined period of time may be for example a few seconds or so. The scan signal generator 20 may allow the user to adjust or set the predetermined period of time, so that the user can adjust this according to the user's own habits or preferences.

Once it has been determined that that a user wishes to capture an image of the object 3 in the scene 2, the device 10 then needs to overlay the overlay template 5 on the display screen 1. On this, as a first point, it may be noted that the overlay template 5 is not displayed at the display screen 1 when the device 10 does not determine that a user wishes to capture an image of an object 3 in the scene 2. That is, as a first criterion, an overlay template 5 is not displayed when the device 10 does not determine that a user wishes to capture an image of an object 3 in the scene 2. One or more other, additional, criteria may be applied to determine when also not to display the overlay template 5 on the display screen 1. In some cases, for example, the overlay template 5 may be being initially displayed but is then not displayed or is "hidden" when one or more other criteria are met.

For example, large or gross movement of the object 3 across the field of view of the camera 12 may be one additional criterion for not displaying or for "hiding" or ceasing display of the overlay template 5. The scan signal generator 20 can track movement of the object 3 as the camera 12 and scene 2 move relative to each other. If for example there is a large movement of the object 3, which is greater than some threshold, and this takes place within a predetermined period of time, then the overlay template 5 is not displayed or is ceased to be displayed. A number of measures are possible for this, which largely may be regarded as equivalent. For example, if the object 3 moves across the display screen 1 by more than some percentage threshold, such as 10% or 20%, etc., of at least one of the width and length of the display screen 1, or equivalently more than some number of pixels across at least one of the width and length of the display screen 1, then this may be treated as a large displacement. This displacement may be measured from frame to frame, or every few (say 10 or 20, etc.) frames, as captured by the camera 12, or equivalently for a predetermined period of time. This reflects the fact that the device 10 may be able to accommodate large movements provided that they occur slowly, and can adjust the overlay template 5 quickly enough to avoid the jumpy appearance that can occur with known arrangements. Large movements of this type can occur when a user deliberately moves the device 10 or the camera 12 around a scene as there will usually be large movements of the camera 12 in such a case.

As another example, fast movement of the object 3 across the field of view of the camera 12 may be an additional criterion for not displaying or for "hiding" or ceasing to display the overlay template 5. If for example the apparent speed of movement of the object 3 is high, and exceeds some threshold, then the overlay template 5 is not displayed. This can therefore happen even if the movement itself is not large. This can often happen by accident, for example because the user's hand is shaking slightly when holding the device 10. Again, a number of measures for this are possible, for example a certain percentage of the display screen 1 or a certain number of pixels of the display screen 1 is traversed per unit time, across at least one of the width and length of the display screen 1.

As another example, one or both of large changes to the scene 2 as a whole and fast changes to the scene 2 as a whole may be an additional criterion or criteria for not displaying or for "hiding" or ceasing to display the overlay template 5. For this, a shot-change detection algorithm may be used to analyse the images being viewed by the camera 12. Shot-change detection algorithms detect differences between frames of an image, such as differences between the current input image frame 30 and one or more previous input image frames 32. Examples of shot-change detection algorithms give a score to each pair of consecutive frames of a digital video score that represents the similarity/dissimilarity between these two frames.

Having determined that an overlay template 5 is to be displayed on the display screen 1, an appropriate overlay template 5 needs to be formed. The overlay template 5 needs to correspond in shape and size to the image of the object 3 as currently being viewed though the camera 12, and therefore being displayed on the display screen 1, so that the overlay template 5 fits correctly and snugly to the object 3 as being viewed.

In this regard, it is common in known systems to generate the overlay template from scratch each time an overlay template is required to be displayed. However, it has been appreciated that this can lead to the overlay template jumping or lagging behind movement of the object across the field of view. In particular, it takes time for a processor of the device in question to analyse the shape and size of the object in the scene, as being currently viewed, and to calculate the corresponding size and shape of the overlay template that is required to match that object as it is being viewed. The processing required to calculate the size and shape of the overlay template is actually relatively complex and, especially on a device, such as a smart phone or the like, that has relatively low processing power, this can take a relatively long time. It will be understood that this "relatively long time" may only be 1 or 2 seconds or so, or even only a few tenths of a second, but delays of that length of time can nevertheless be highly noticeable and distracting to the user.

To avoid this, in this example the overlay template 5 is not generated from scratch every time an overlay template 5 is required. Rather, as an initial stage, the scan signal generator 20 sends an instruction to the object detector 22 for the object detector 22 to analyse the current image being viewed by the camera 12, for example by analysing the current input image frame 30. The object detector 22 identifies the object 3, for example the document 3, and generates an overlay template 5 based on the current object 3 and scene as currently being viewed through the camera 12 and saves that overlay template 5 in the current template holder 26. The current template holder 26 in an example is part of the volatile data storage 16 so that space in the non-volatile data storage 18 is not used unnecessarily. This overlay template 5 which has just been generated may be regarded as an initial overlay template 5. It may be noted that if there is already an overlay template saved in the current template holder 26, then the scan signal generator 20 sends an instruction to the current template holder 26 to discard that old overlay template.

Then, and having determined that an overlay template 5 should be presented on the display screen 1 for the current image being viewed by the camera 12 and therefore currently being displayed on the display screen 1, the scan signal generator 20 sends an instruction to the template overlayer 24 to use the previous template 5. In this example at this point, the overlay template 5 which is saved in the current template holder 26 is suitable to be overlaid directly on the object 3 as currently being presented on the display screen 1, because for example there has been no large or fast movement of the object 3 across the display screen 1. The template overlayer 24 therefore retrieves the current overlay template 5 from the current template holder 26 and overlays the current overlay template 5 on the object 3 as being presented on the display screen 1.

On the other hand, if the scan signal generator 20 determines that the object 3 has moved within the image as being presented on the display screen 1, or equivalently the object 3 has moved across the field of view of the camera 12, then a different overlay template 5 needs to be formed so as to correspond in shape and size to the image of the object 3 as now being viewed though the camera 12. As is now clear, the preference is not to generate the overlay template 5 from scratch again. To avoid this, the scan signal generator 20 determines if it is more efficient, and therefore faster, to amend the current overlay template 5 which is currently being stored in the current template holder 26. If so, then the scan signal generator 20 instructs the template overlayer 24 to retrieve the current overlay template 5 from the current template holder 26 and adjust the shape and size of the overlay template 5 as necessary to correspond to the object 3 as now being displayed on the display screen 1. The template overlayer 24 achieves this by applying a transform to the overlay template 5 that is retrieved from the current template holder 26. Examples of how to do this will be discussed further below. Then the new, adjusted overlay template 5 is overlaid on the object 3 as currently being presented on the display screen 1.

The scan signal generator 20 can determine if it is more efficient, and therefore faster, to amend the current overlay template 5 which is currently being stored in the current template holder 26 than to generate the new overlay template 5 from scratch by tracking movement of the object 3 as the camera 12 and scene 2 move relative to each other. For example, if there has been a large or gross movement of the object 3 across the field of view of the camera 12, then it may be quicker to generate a new overlay template 5 rather than to attempt to amend the current overlay template 5. Similarly, if there has been a large change in shape of the object 3, because for example the object 3 has been twisted or folded, then again it may be quicker to generate a new overlay template 5 rather than to attempt to amend the current overlay template 5. Indeed, if there is an entirely different object 3 in view, because for example the user has moved the field of view of the camera 12 to focus on a completely different object, then again it may be quicker to generate a new overlay template 5. Further, if there has been a large change to the scene 2 as a whole, then it may be quicker to generate a new overlay template 5. However, in general, at least for relatively small changes in size and shape of the object 3 or for small changes of scene as a whole, it will typically be quicker to amend the current overlay template 5 and this is followed whenever possible.

The result of this is that the overlay template 5 is only displayed when necessary, that is when it is determined that a user wishes to capture an image of an object in the scene, and in general, for at least most of the time, the overlay template 5 that is used is not generated from scratch each time of the current scene and object, and instead the overlay template 5 that is used is an amended or transformed version of an overlay template 5 that has been generated previously. This reduces to a minimum the jumping around and lagging over overlay templates that occur with known systems and can give the appearance that the overlay template 5 is "sticking" better to the object 3 from frame to frame.

As mentioned, the scan signal generator 20 tracks movement of the object 3 as the camera 12 and scene 2 move relative to each other, or tracks changes to the scene 2 as a whole, or both. In examples, this is used to determine when a user wishes to capture an image of an object 3 in a scene 2. In examples, this is also used to determine when not to show or to hide the overlay template 5, because of for example large or fast movements of the device 10 or camera 12 relative to the scene 2. A number of options for techniques for tracking movement of the object 3 or the scene 2 as whole as the camera 12 and scene 2 move relative to each other are possible. In this regard, it may be noted that the technique for tracking this relative movement and changes does not have to be perfectly accurate or produce particularly high quality results. This is because the tracking is not being used for say upscaling of the image, for which high accuracy is a strong requirement. Rather, the tracking is only being used to decide whether or not to display the overlay template 5. Therefore, relatively old or simple techniques may be used. This is a particular advantage in the case that the device 10 has relatively low processing power, as is the case for a smart phone or tablet computer or the like.

For this, a shot-change detection algorithm may be used to analyse the images being viewed by the camera 12. As mentioned, shot-change detection algorithms detect differences between frames of an image, such as differences between the current input image frame 30 and one or more previous input image frames 32. Examples of shot-change detection algorithms give a score to each pair of consecutive frames of a digital video score that represents the similarity/dissimilarity between these two frames, which can then be used herein to determine when a user wishes to capture an image of an object 3 in a scene 2, to determine when not to show or to hide the overlay template 5, or both. Examples of shot-change detection algorithms may use one or more of the sum of absolute differences, histogram differences and edge change ratio techniques. The use of histogram differences has particular advantage in the present example as the processing requirements are particularly low.

Also, some devices have one or more inertial measurement units (IMUs), such as an accelerometer, a gyroscope, and sometimes a magnetometer. In addition to or instead of analysing the image frames 30, 32 to track movement, it is possible to use input signals 34 from one or more of the IMUs of the device 20 to enable the device 20 to track the movement.

It is mentioned above that in an example, the scan signal generator 20 determines that a user wishes to capture an image of the object 3 in the scene 2 by determining that the camera 12 has been viewing the scene 2 for longer than a predetermined period of time. This may also use one or both of analysis of the image frames, using for example a shot-change detection algorithm, and use of signals from one or more IMUs of the device 10.

Further, as mentioned, rather then generating an overlay template 5 from scratch every time an overlay template 5 is required, when possible a previously saved overlay template 5 is recalled and amended to fit the document or other object 3 in the scene 2 that is currently being viewed. To amend a previously saved overlay template 5, a transform is applied to the overlay template 5 that is retrieved from the current template holder 26 to adjust the size and shape of the overlay template 5 as necessary. A number of techniques for determining the transform to be applied are possible. Again, because perfect accuracy is not required, a relatively old or simple technique may be used, which is a particular advantage in the case that the device 10 has relatively low processing power, as is the case for a smart phone or tablet computer or the like.

In an example for determining the transform to be applied, one or more features in the current image may be tracked from frame to frame, or from one frame to another frame that is a plurality of frames away. For this, one or more features in the frame are identified. Techniques for feature detection are known, which may look for one or more of edges in the image, corners in the image, ridges in the image, other interest points in the image, etc. As a particular example, the "goodFeaturesToTrack" algorithm of OpenCV may be used to identify features to be tracked, including particularly corners or other sharp points. Other techniques, including techniques provided as part of the OpenCV library, may look for edges, including techniques that use the known Canny and Harris techniques.

In a particular example, once a document has been identified in a frame or image currently being viewed, features within the body of the document are identified and tracked. Such features within the body of the document may be used instead of or in addition to corners or edges of the document, depending on the implementation example. An advantage of using within the body of the document, instead of or in addition to corners or edges of the document, is that this can cope better with folding or other distortion of the object within the image, rather than just wholesale movement of the object as a whole. As will be understood, in the case that the object is a document, this can be of particular advantage.

Movement of the features of the image generally or movement of the features of the object in particular can be tracked using for example an optical flow technique. An example is the Lucas-Kanade method, which is used in for example the calcOpticalFlowPyrLK method of OpenCV. The movement of the features of or within the object can also be used to obtain the necessary change of perspective of the object which may be required. As an example, the getPerspectiveTransform method of OpenCV may be used.

In addition to or instead of analysing the image frames 30, 32 for determining the transform to be applied, and in the case of devices that have one or more inertial measurement units (IMUs), such as an accelerometer, a gyroscope, and sometimes a magnetometer, it is possible to use input signals 34 from one or more of the IMUs of the device 20 to enable the device 20 to determine the transform to be applied.

It was mentioned above that a main purpose of the scan signal generator 20 is to determine when a new overlay template 5 should be generated. It was also mentioned above that this may be carried out by the scan signal generator 20 without requiring a manual input or the like from the user, for example, by the user pressing a hard button of the device 10 or a soft button on the display screen 1 in the case that the display screen 1 is a touch screen. Nevertheless, as an option, the device 10 may allow the user to provide a manual input to force the scan signal generator 20 to issue an instruction for a new overlay template 5 to be generated. This is illustrated schematically in FIG. 3 which shows input manual signals 36. For example, the user may be able to see that the current template that is being displayed is not correct, for example, because it does not fit the object 3 well. In this example, the user can therefore input a manual signal 36, which is taken by the scan signal generator 20 as an instruction to cause a new overlay template 5 to be generated from scratch for the object 3 currently being viewed. The manual signal may be one or more of pressing of a specific hard or soft button on the computing device 10, double-tapping on a touch screen of the computing device 10, shaking the computing device 10, etc. It may be noted that such actions with the computing device 10 might not involve a shot change, which otherwise might automatically result in the scan signal generator 20 sending an instruction to cause a new overlay template 5 to be generated as discussed above.

Figure 4:
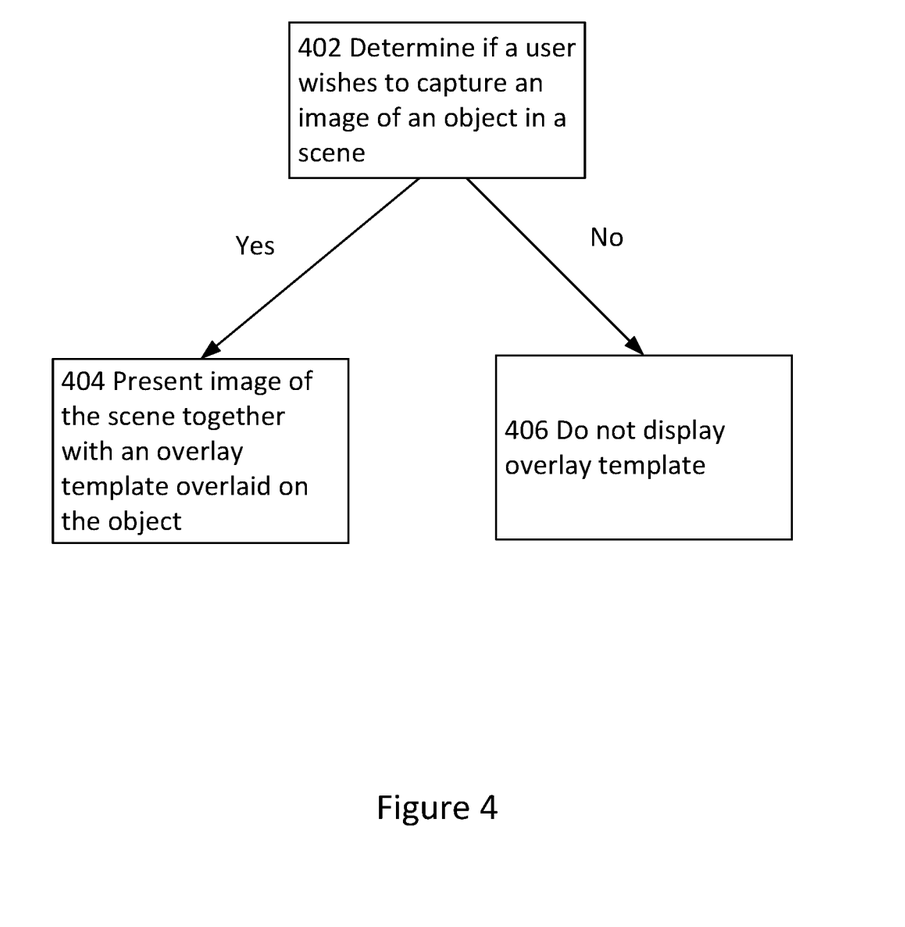
FIG. 4 shows a schematic flow chart for an example of a method according to the present disclosure.

Referring to FIG. 4, this shows a schematic flow chart for an example of a method of operating a computing device for capture of an image of an object in a scene according to the present disclosure.

At 402, the computing device automatically determines if a user wishes to capture an image of an object in a scene via a camera of the computing device.

In response to the computing device automatically determining at 402 that a user wishes to capture an image of an object in the scene, at 404 the computing device presents at a display screen of the computing device an image of the scene together with an overlay template. The overlay template corresponds in shape to the object in the scene and is overlaid on the object in the scene when displayed at the display screen.

On the other hand, when the computing device does not determine that a user wishes to capture an image of an object in the scene, then, as indicated at 406, the overlay template is not displayed at the display screen.

In an example, the computing device automatically determines that a user wishes to capture an image of an object in the scene by determining that the camera has been viewing the scene for longer than a predetermined period of time.

In an example, the computing device does not display the overlay template at the display screen if the computing device determines that displacement of an object in the scene across the field of view of the camera within a predetermined period of time is greater than a threshold.

In an example, the computing device does not display the overlay template at the display screen if the computing device determines that speed of movement of an object in the scene across the field of view of the camera is greater than a threshold.

This checking for relative speed of movement of the object may be carried out in addition to or instead of checking for relative displacement of the object.

In an example, the computing device does not display the overlay template at the display screen if the computing device determines that an overall change in the scene exceeds a threshold.

In an example, the method comprises:
generating a first overlay template to be overlaid on the image of the object in the scene when displayed at the display screen based on the image of the object in the scene at a first time instant;
saving a copy of the first overlay template in data storage of the computing device; and
tracking movement of the object across the field of view of the camera from the first time instant to a second time instant.

In an example, if the computing device determines that a user wishes to capture an image of the object in the scene via the camera of the computing device at the second time instant, the computing device applies a transform to the first overlay template so as to amend the shape of the overlay template to generate a second overlay template which corresponds in shape to the object in the scene at the second time instant; and the method comprises:
overlaying the second overlay template on the object in the scene when displayed at the display screen at the second time instant.

This avoids having to generate the overlay template from scratch each time a user wants to capture an image of an object in the scene. This enables the amended overlay template to be presented on the display screen more quickly, and potentially more accurately, when the computing device determines that the user wishes to capture an image of the object in the scene at the second time instant. This further assists in avoiding the overlay template appearing to "jump around" from one time instant to another.

In an example, the computing device determines the transform to be applied to the first overlay template by tracking a plurality of features within the object as the object moves across the field of view of the camera.

In an example, the computing device determines the transform to be applied to the first overlay template by tracking a plurality of features within the object and at least one corner of the object as the object moves across the field of view of the camera.

In an example, the method comprises, in the case that a difference between the scene at the second time instant and the scene at the first time instant is greater than a threshold, discarding any copy of the first overlay template that is saved in the data storage of the computing device, and generating a new first overlay template to be overlaid on the image of the object in the scene when displayed at the display screen based on the image of the object in the scene at the second time instant.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and semiconductor memory (e.g. a solid-state drive or SSD, particularly in the case of non-volatile semiconductor memory).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method of operating a computing device for capture of an image of an object in a scene, the computing device comprising a camera and a display screen, the method comprising:
the computing device automatically determining to capture an image of an object that is in a scene being viewed through the camera of the computing device;
in response to the computing device automatically determining to capture an image of the object that is in the scene, the computing device presenting at the display screen an image of the scene together with an overlay template, wherein the overlay template corresponds in shape to the object in the scene and is overlaid on the object in the scene when displayed at the display screen, wherein the overlay template is retrieved from a current template holder in volatile memory on the computing device, and wherein the overlay template was stored in the volatile memory based on detecting the object in a previous image capture of the scene; and
the computing device capturing an image of the object in the scene by capturing an image in real time of a first portion of the scene that is framed by the overlay template, the image excluding a second portion of the scene that is not framed by the overlay template;

wherein the overlay template is not displayed at the display screen when the computing device does not determine to capture an image of the object in the scene.

2. A method according to claim 1, wherein the computing device automatically determines to capture an image of the object in the scene by determining that the camera has been viewing the scene for longer than a predetermined period of time.

3. A method according to claim 1, wherein the current template holder stores a last overlay template applied to a captured image of the scene.

4. A method according to claim 1, wherein the current template holder holds a single overlay template, and wherein adding a new overlay template to the current template holder causes the single overlay template to be discarded and the new overlay template stored.

5. A method according to claim 1, wherein the computing device does not display the overlay template at the display screen if the computing device determines that an overall change in the scene exceeds a threshold.

6. A method according to claim 1, comprising:
generating a first overlay template to be overlaid on the image of the object in the scene when displayed at the display screen based on the image of the object in the scene at a first time instant;
saving a copy of the first overlay template in data storage of the computing device; and
tracking movement of the object across a field of view of the camera from the first time instant to a second time instant.

7. A method according to claim 6, wherein, if the computing device determines to capture an image of the object in the scene via the camera of the computing device at the second time instant, the computing device applies a transform to the first overlay template so as to amend the shape of the overlay template to generate a second overlay template which corresponds in shape to the object in the scene at the second time instant; and
the method comprises:
overlaying the second overlay template on the object in the scene when displayed at the display screen at the second time instant.

8. A method according to claim 7, wherein the computing device determines the transform to be applied to the first overlay template by tracking a plurality of features within the object as the object moves across the field of view of the camera.

9. A method according to claim 7, wherein the computing device determines the transform to be applied to the first overlay template by tracking a plurality of features within the object and at least one corner of the object as the object moves across the field of view of the camera.

10. A method according to claim 6, comprising, when a difference between the scene at the second time instant and the scene at the first time instant is greater than a threshold, discarding any copy of the first overlay template that is saved in the data storage of the computing device, and generating a new first overlay template to be overlaid on the image of the object in the scene when displayed at the display screen based on the image of the object in the scene at the second time instant.

11. A computing device for capture of an image of an object in a scene, the computing device comprising:

a camera;
a display screen; and
a processing system constructed and arranged to cause the computing device to carry out a method comprising:
the computing device automatically determining when a user wishes to capture an image of an object that is in a scene being viewed through the camera of the computing device;
in response to the computing device automatically determining that a user wishes to capture an image of the object that is in the scene, the computing device presenting at the display screen an image of the scene together with an overlay template, wherein the overlay template corresponds in shape to the object in the scene and is overlaid on the object in the scene when displayed at the display screen, wherein the overlay template is retrieved from a current template holder in volatile memory on the computing device, and wherein the overlay template was stored in the volatile memory based on detecting the object in a previous image capture of the scene; and
the computing device capturing an image of the object in the scene by capturing in real time an image of a first portion of the scene that is framed by the overlay template, the image excluding a second portion of the scene that is not framed by the overlay template;
wherein the overlay template is not displayed at the display screen when the computing device does not determine to capture an image of the object in the scene.

12. A computing device according to claim 11, wherein the method further comprises:
generating a first overlay template to be overlaid on the image of the object in the scene when displayed at the display screen based on the image of the object in the scene at a first time instant;
saving a copy of the first overlay template in data storage of the computing device; and
tracking movement of the object across a field of view of the camera from the first time instant to a second time instant.

13. A computing device according to claim 12, wherein, if the computing device determines to capture an image of the object in the scene via the camera of the computing device at the second time instant, the computing device applies a transform to the first overlay template so as to amend the shape of the overlay template to generate a second overlay template which corresponds in shape to the object in the scene at the second time instant; and wherein the method further comprises:
overlaying the second overlay template on the object in the scene when displayed at the display screen at the second time instant.

14. A computing device according to claim 13, wherein the computing device determines the transform to be applied to the first overlay template by tracking a plurality of features within the object as the object moves across the field of view of the camera.

15. A computing device according to claim 13, wherein the computing device determines the transform to be applied to the first overlay template by tracking a plurality of features within the object and at least one corner of the object as the object moves across the field of view of the camera.

16. A computing device according to claim 12, comprising, when a difference between the scene at the second time instant and the scene at the first time instant is greater than a threshold, discarding any copy of the first overlay template that is saved in the data storage of the computing device, and generating a new first overlay template to be overlaid on the image of the object in the scene when displayed at the display screen based on the image of the object in the scene at the second time instant.

17. A method for capturing one or more images with one or more objects using a computing device, comprising:
    capturing, using a camera on the computing device, a first input frame that includes a scene with an object;
    based on detecting the object in the first input frame using an object detection model to detect the object, generating an overlay template that corresponds in shape to the object;
    presenting, within a display screen of the computing device showing the first input frame, the overlay template overlaid on the object;
    storing the overlay template within volatile memory of the computing device;
    capturing, using the camera on the computing device, a second input frame that includes the scene with the object;
    based on detecting the object in the second input frame, retrieving the overlay template from the volatile memory of the computing device and applying the overlay template to the object in the second input frame; and
    capturing an image of the object from the second input frame, wherein the image excludes portions of the scene that lie outside of the overlay template.

18. The method of claim 17, further comprising:
    determining the shape of the object in the second input frame relative to the first input frame; and
    retrieving the overlay template from the volatile memory of the computing device based on detecting that a change in the shape is within a threshold amount.

19. The method of claim 17, wherein storing the overlay template within the volatile memory includes replacing a previously stored overlay template within the volatile memory corresponding to a previous captured input frame.

20. The method of claim 17, further comprising determining that a new overlay template is not needed between the first input frame and the second input frame based on comparing the object between the first input frame and the second input frame.

* * * * *